Dec. 4, 1934.  F. A. VOLZ  1,983,503
MEASURING RULE
Filed Feb. 25, 1933   2 Sheets-Sheet 1
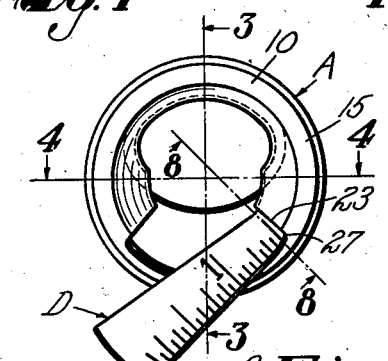
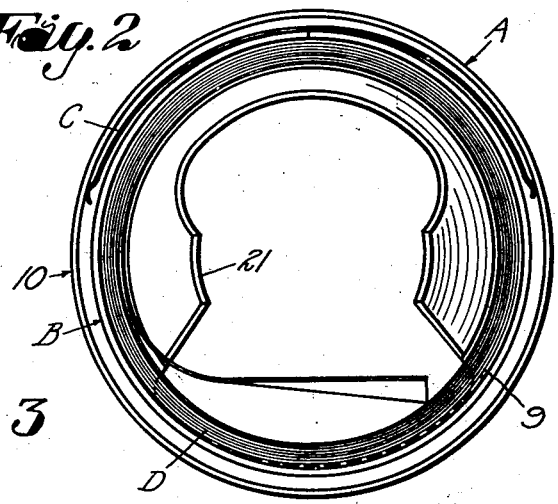
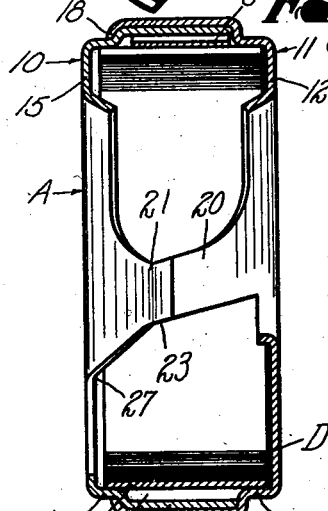
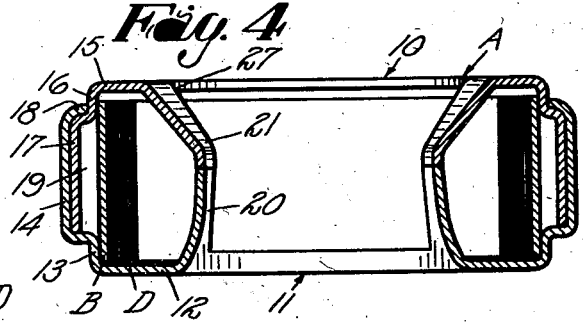
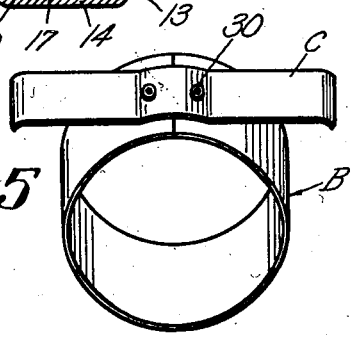
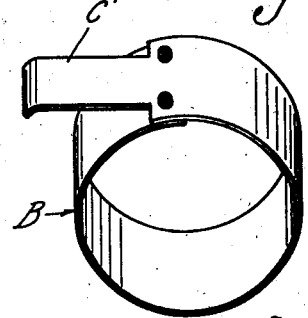
Inventor
Frederick A. Volz Dec. 4, 1934.     F. A. VOLZ     1,983,503
MEASURING RULE
Filed Feb. 25, 1933    2 Sheets-Sheet 2

Inventor
*Frederick A. Volz*

By *T. Clay Lindsey*

Attorney

Patented Dec. 4, 1934

1,983,503

UNITED STATES PATENT OFFICE 1,983,503

MEASURING RULE

Frederick A. Volz, New Britain, Conn., assignor to The Stanley Works, New Britain, Conn., a corporation of Connecticut Application February 25, 1933, Serial No. 658,547

13 Claims. (Cl. 33—138)

In the patent to Farrand No. 1,402,589 dated January 3, 1922, is disclosed a measuring device including a resilient metallic ribbon or tape of transverse curvature and having an inherent tendency to assume a straight or rod-like form, and a holder in which the flexible rule is adapted to be coiled in such condition as to permit uncoiling of the rule from its inner end, rules of this sort being known as the "inside wind" type. This invention relates generally to rules of this type, although certain features may be incorporated in rules of the "outside wind" type.

The aim of the invention is to provide an improved inside wind type of rule having various features of novelty and advantage and which is particularly characterized by the ease and facility with which the end of the rule may be inserted into the casing preliminary to the winding operation and in which the uncoiling and coiling operations may be very easily and evenly carried out without danger of injuring the rule.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, one of the many embodiments which the present invention may take:

Figure 1 is a view looking at the top of the device with the rule partially uncoiled;

Fig. 2 is a view looking towards the back of the cover portion of the casing, the rear half of the casing being removed;

Fig. 3 is a transverse sectional view through the device, this view being taken substantially on line 3—3 of Fig. 1;

Fig. 4 is a like view taken on line 4—4 of Fig. 1;

Fig. 5 shows one form of rotatable ring within which the rule is adapted to be coiled;

Fig. 6 is another form of ring;

Figure 7:
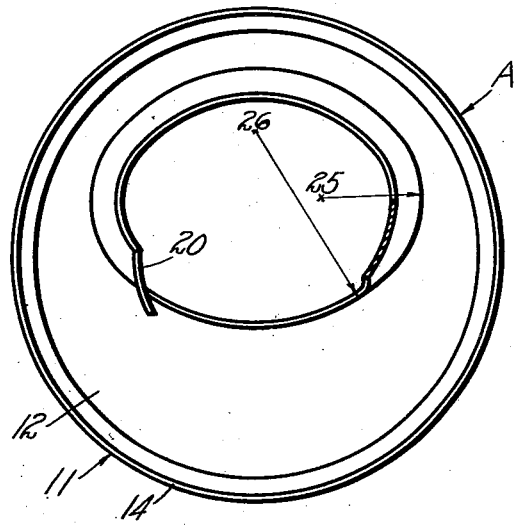
Fig. 7 is a top view of the bottom half of the casing.

Referring to the drawings in detail, A denotes generally the casing within which is rotatably mounted a case in the form of a cylindrical ring B, free rotation of which is prevented by means of a brake in the form of a spring C interposed between the ring and the casing and adapted to frictionally engage the cylindrical wall of one of those elements. The letter D designates the measuring tape which, as in said Farrand patent, is in the form of a metallic ribbon curved to have a concavo-convex section and sufficiently flexible to permit of its being rolled or coiled; its stiffness and resiliency being sufficient to cause it to assume and retain a straight rod-like condition when permitted to do so.

In the present illustrative disclosure, the casing A is in the form of two complementary sheet metal parts 10 and 11 adapted to telescope one into the other. The casing part 11, which, for convenience, is called the bottom part, has a bottom wall 12 and a cylindrical wall with portions of different diameters, namely, a short portion 13 and a longer portion or skirt 14 offset outwardly from the portion 13. The top portion of the casing has an annular rim 15, and a peripheral wall having a relatively short portion 16 of the same diameter as the portion 13 and a skirt portion 17 adapted to fit in the skirt 14. The parts are held together by closing the outer skirt over the shoulder on the part 10, as at 18. It will be observed that there is provided within the casing an annular groove 19 above and below which are internal bearing surfaces provided by the portions 13 and 16 of the cylindrical walls, and the purpose of which arrangement will be described more in detail hereinafter.

The casing to each side of the line 3—3 in Fig. 1 is of like construction and, therefore, a description of one side will apply to the other side. It may be said here, however, that the casing is provided with two entrance openings or mouths in order to permit the tape to be wound either in a right hand direction or a left hand direction within the casing, depending upon the whim of the particular user. The casing has a bridge portion extending from the top to the bottom of the casing. This bridge includes an ear 20 projecting upwardly from the bottom of the casing and an ear 21 on the rim 15 inclined towards the center of the casing and towards the bottom of the casing. The lower end of the ear 21 registers with the top of the ear or lug 20. This bridge portion forms the inner side of an entrance opening or mouth for the tape, and it is so arranged as to facilitate easy entrance of the tape into the casing. It will be observed that the mouth is relatively narrow in a radial direction at the top of the casing and is relatively wide at the bottom of the casing. The width of the mouth at its top is designated by the letter $x$ in Fig. 8, and the width of the mouth at the bottom is designated by the letter $y$. Also, the forward edge 23 of the bridge is inclined backwardly (i. e., in the direction in which the tape travels in entering the casing) with respect to a radius of the casing passing through the front corner of the mouth.

Figure 8:
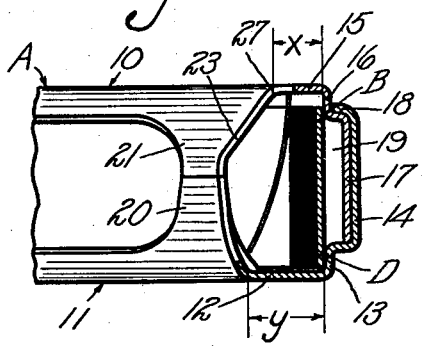
Fig. 8 is a sectional view of the casing taken substantially on a line 8—8 of Fig. 1.

In rules of this type, as previously made, not infrequently the rules have become distorted or twisted spirally due to the fact that the outer edge of the rule is forced against the top corner of the mouth, and the face of the rule, immediately adjacent the inner edge thereof, is forced and drawn over the bottom edge of the bridge, thereby ironing, so to speak, the inner edge of the rule. It is an object of the present invention to eliminate this ironing effect and resultant damage to the rule. To this end, the lug 20, adjacent its base, is curved about an axis eccentrically placed backwardly of the center of curvature of the casing, and the lug, adjacent its forward end, is relieved. In the present illustrative disclosure, as will be seen most clearly from Fig. 7, the lug, adjacent its base, is curved about a center 25, and the lug, adjacent its forward edge, is struck about a longer radius and about a center 26 rearwardly of the center 25. The lug, at its bottom portion, also is inclined upwardly and inwardly towards the center of the casing. With this arrangement, an ironing effect on the rule is avoided in all conditions of operating the rule. If the rule is forced against the bridge adjacent its top, as at the point 27, it will bear edgewise at that point and, consequently, has practically no ironing effect on the rule blade. The inner edge of the rule, as shown in Fig. 8, will bear against the lug 20 rearwardly of the forward edge of that lug and, as the lug is more or less sharply relieved at its forward edge, there is a radius of sufficient length to prevent any ironing effect.

It is to be understood that, when the blade is wound into the ring, it will, due to being longitudinally flexed, straighten out into flat cross section, as explained in said Farrand patent. Difficulty, due to the tendency of the rule to resist bending, may be experienced in initially inserting the end of the rule into the casing. In order to facilitate initial entry of the rule into the casing, the end of the rule which goes into the casing first and which would ordinarily bear the highest scale mark, is rendered more easily bendable or flexible, say for a portion of about one-half an inch or so. This end of the rule is designated by the numeral 9 in Fig. 2. Thus, when starting the end 9 of the rule into the mouth of the casing, it may more readily accommodate itself to the curvature of the casing and rule ring, and is less liable to dig into, and stick against, those members. The end of the rule may be reduced in stiffness by putting a counteracting set in this portion of the rule at the same time reducing some of the set which forms the concavo-convex section.

Figure 9:
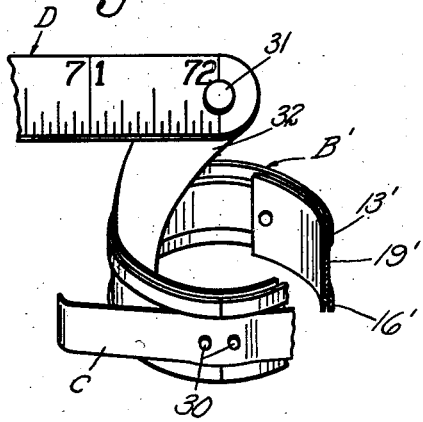
Fig. 9 is a perspective view of another type of rotary ring, in this view the inner end of the measuring rule being pivotally connected to an anchoring strip which, in turn, is connected to the ring.

In the embodiment shown in Fig. 9, the inner end of the rule is illustrated as being pivotally connected, as by a pin or rivet 31, to a short attaching strip 32 which, in turn, is secured to the ring B'. The attaching strip 32 may be formed of a ribbon having characteristics similar to the metal tape. With this arrangement, the rule is more or less permanently connected to the ring although, if desired, the connection 31 may be a quick detachable one. The pivotal connection permits the rule to be swung to desired positions and allows the inner end of the rule to be employed as a starting point of the measurement being taken. In this embodiment, the inner or pivoted end of the rule is rendered more easily bendable or flexible in the same manner and for the same purposes as is the inner end of the rule where the rule is not attached to the ring, as in the preceding embodiment. Also, by preference, the outer end of the attaching strip is rendered more easily bendable or flexible. Thus, the overlapping ends of the attaching strip and rule are sufficiently pliable so that the double thickness at this point will not materially interfere with the ease and facility with which the rule may be wound up in the ring.

The rotary rule case B may be of any suitable form, it here being shown as comprising a ring formed of a strip of metal rolled into cylindrical shape. This ring is of such height that it will more or less loosely fit between the top and bottom walls of the casing, and is of such diameter that it will loosely engage the peripheral walls 16 and 13 of the casing to opposite sides of the annular groove 19. Interposed between the peripheral walls of the ring and casing is a brake which may be in the form of a leaf spring C, this spring, in the embodiment shown in Figs. 1 to 8, being accommodated by the groove 19. The spring, as shown in Fig. 5, may be in the form of a strip having two spring fingers. The spring at its intermediate portion may be secured to the ring by means of rivets 30. In Fig. 6, the spring C' is formed as an integral part of the ring itself, it being observed that this spring finger projects outwardly and beyond the joint in the ring. This spring effects a braking action on the rotating case and, preferably, the friction or resistance to rotation exerted by the ring just counterbalances, as nearly as practical, the tendency of the rule to assume a rectilinear shape. The advantage of this arrangement is that the rule is prevented from shooting out of the casing. In other words, the device is of the balanced or push-pull type in which it is necessary to push the rule in and pull it out, as distinguished from permitting the rule to uncoil itself when there is no resistance to the uncoiling operation.

It will be observed, as previously pointed out, that, in the embodiment shown in Figs. 1 to 8, the spring, which constitutes the brake, is positioned within the groove 19 of the casing. If desired, the ring element may be provided with a groove for accommodating the spring, this arrangement being shown in Fig. 9 wherein the ring B' has a circumferential groove 19'. In this case, the ring has bearing surfaces 13' and 16' adapted to bear against the inner periphery of the cylindrical wall of the casing. If a groove were not provided for accommodating the spring there would be an uneven braking action when pushing the rule into the casing or pulling it out, due to the fact that the force exerted on the rule tends to force the rotating ring against the side of the casing in a direction in which the rule blade itself is fed into or pulled out of the casing. When the spring comes in line with this force, the friction is increased between the ring rule and the casing and then, when the spring moves out of this line of force, the friction is lessened. By providing the channel either in the casing or the ring, the spring is allowed to maintain practically uniform tension, since the rule ring itself will directly engage the peripheral wall of the casing. Therefore, the force exerted in entering or withdrawing the rule cannot, except slightly, compress or release the fixed tension of the brake spring, which means that an even, smooth action is had when winding or unwinding the rule. It is not necessary that the spring brake be secured to the ring.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a flexible ribbon rule of concavo-convex cross section and sufficient stiffness to maintain itself in substantially straight form, a casing for maintaining said rule in an annular coiled condition and formed to allow it to be coiled and uncoiled from its inner end, said casing having an entrance mouth between the top and bottom sides thereof provided with an edge passing through the annulus, said edge being inclined away from a plane passing through the axis of said casing and the juncture of said edge with the top of said casing, on the side of said plane opposite the major portion of the mouth.

2. In combination, a flexible ribbon rule of concavo-convex cross section and sufficient stiffness to maintain itself in substantially straight form, a casing for maintaining said rule in a coiled condition and formed to allow it to be coiled and uncoiled from its inner end, said casing having an entrance mouth provided with an edge passing through the coil, said edge being inclined away from a plane passing through the axis of said casing and the juncture of said edge with the top of said casing, on the side of said plane opposite the major portion of the mouth, the side of said mouth adjacent to the bottom side of said casing being wider than the side adjacent to the top side of said casing.

3. In combination, a cylindrical casing for receiving a flexible rule of concavo-convex cross section and within which the rule is adapted to be coiled in a condition to allow it to be coiled or uncoiled from its inner end, a mouth in said casing for the insertion and withdrawal of the rule therethrough and a rotary case in said casing and within which the rule is adapted to be wound, said casing having a bridge with an edge forming one side of the mouth of the casing, said bridge adjacent the bottom side of the casing having a curvature in the plane of the bottom side of the casing of lesser radius than the casing, the center of curvature of the bridge being on that side of the center of curvature of the casing opposite to said mouth.

4. In combination, a cylindrical casing for receiving a flexible rule of concavo-convex cross section and within which the rule is adapted to be coiled in a condition to allow it to be coiled or uncoiled from its inner end, a mouth in said casing for the insertion and withdrawal of the rule therethrough and a rotary case in said casing and within which the rule is adapted to be wound, said casing having a bridge with an edge forming one side of the mouth of the casing, said bridge adjacent the bottom side of the casing having a curvature in the plane of the bottom side of the casing of lesser radius than the casing, the center of curvature of the bridge being on that side of the center of curvature of the casing opposite to said mouth, said bridge adjacent said bottom and its forward edge being inclined inwardly towards the center of the casing.

5. In combination, a cylindrical casing for receiving a flexible rule of concavo-convex cross section and within which the rule is adapted to be coiled in a condition to allow it to be coiled or uncoiled from its inner end, a mouth in said casing for the insertion and withdrawal of the rule therethrough and a rotary case in said casing and within which said rule is adapted to be wound, said casing having a bridge with an edge forming one side of the mouth of the casing and inclined backwardly with respect to a radial line of the casing passing through the forward upper corner of the mouth, said bridge adjacent the bottom of the casing having a curvature in the plane of the bottom side of the casing of lesser radius than the casing, the center of curvature of the bridge being on that side of the center of curvature of the casing opposite to said mouth.

6. In combination, a cylindrical casing for receiving a flexible rule of concavo-convex cross section and within which the rule is adapted to be coiled in a condition to allow it to be coiled or uncoiled from its inner end, a mouth in said casing for the insertion and withdrawal of the rule therethrough and a rotary case in said casing and within which said rule is adapted to be wound, said casing having a bridge with an edge forming one side of the mouth of the casing and inclined backwardly with respect to a radial line of the casing passing through the forward upper corner of the mouth, said bridge adjacent the bottom of the casing having a curvature in the plane of the bottom side of the casing of lesser radius than the casing, the center of curvature of the bridge being on that side of the center of curvature of the casing opposite to said mouth, said bridge adjacent its bottom being inclined inwardly towards the center of the casing and upwardly.

7. In combination, a casing member having a cylindrical wall, a rotatable case member mounted in said casing member, one of said members having a circumferential annular channel and bearing surfaces at the opposite sides of the channel, said bearing surfaces being adapted to engage the peripheral wall of the other member, and a resilient brake member accommodated by said channel and interposed between said first members.

8. In combination, a casing having a cylindrical wall provided with an annular channel and cylindrical bearing surfaces to opposite sides of the channel, a rotatable case mounted in the casing and adapted to bear against said bearing surfaces, and a brake in the form of a spring accommodated by said channel interposed between said casing and case and adapted to bear against the peripheral wall of one of them.

9. In combination, a casing having a cylindrical wall, a rotatable case having a cylindrical wall adapted to engage said first wall, one of said walls having an annular channel, and a spring finger constituting a brake fixed to said case accommodated by said channel and bearing against the cylindrical wall of said casing.

10. In combination, a flexible ribbon rule of concavo-convex cross section and sufficient stiffness to maintain itself in substantially straight form, and a casing within which said rule is adapted to be coiled and uncoiled, the entering end of said rule being relatively more flexible than the major portion of the rule so as to facilitate entry of the rule into the casing.

11. In combination, a flexible ribbon rule of concavo-convex cross section and sufficient stiffness to maintain itself in substantially straight form, a casing for maintaining said rule in a coiled condition and formed to allow it to be coiled and uncoiled from its inner end, and a rotatable case in said casing within which said rule is adapted to be coiled, the entering end of said rule being relatively more flexible than the major portion of the rule in order to facilitate entry of the rule into the casing.

12. In combination, a flexible ribbon rule of concavo-convex cross section and sufficient stiffness to maintain itself in substantially straight form, a casing within which said rule is adapted to be coiled and uncoiled, and an attaching strip anchored within the casing and connected in overlapping relation to the inner end of said rule, the outer end of said strip and the inner end of said rule being relatively more flexible than the major portion of the rule.

13. A flexible ribbon rule of concavo-convex cross section and of sufficient stiffness to maintain itself in substantially straight form, said rule being adapted to be coiled in a casing or the like, one end of said rule being of reduced stiffness transversely in order to facilitate entry of that end of the rule into the casing.

FREDERICK A. VOLZ.